United States Patent [19]
Perelson et al.

[11] Patent Number: 5,448,668
[45] Date of Patent: Sep. 5, 1995

[54] METHOD OF DETECTING CHANGES TO A COLLECTION OF DIGITAL SIGNALS

[76] Inventors: Alan S. Perelson, 820 Los Arboles La., Santa Fe, N. Mex. 87501;
Stephanie Forrest, 440 Amherst NE, Albuquerque, N. Mex. 87106;
Lawrence C. Allen, 56 Tecolote Rd., Tijeras, N. Mex. 87059

[21] Appl. No.: 89,014

[22] Filed: Jul. 8, 1993

[51] Int. Cl.$^6$ .............................. H04L 9/00
[52] U.S. Cl. ..................... 395/182.19; 371/67.1
[58] Field of Search ............... 395/575; 371/27, 67.1, 371/68.3; 380/4; 375/114, 116; 364/728.03

[56] References Cited

U.S. PATENT DOCUMENTS

| | | | |
|---|---|---|---|
| 4,788,684 | 11/1988 | Kawaguchi et al. | 371/27 |
| 4,835,774 | 5/1989 | Ooshima et al. | 371/27 |
| 5,054,035 | 10/1991 | Tarallo et al. | 370/105.4 |
| 5,121,345 | 6/1992 | Lentz | 364/550 |
| 5,163,057 | 11/1992 | Grupp | 371/20.4 |
| 5,210,754 | 5/1993 | Takahashi et al. | 375/116 |
| 5,212,697 | 5/1993 | Morita | 371/67.1 |
| 5,278,901 | 1/1994 | Shieh et al. | 380/4 |
| 5,319,776 | 6/1994 | Hile et al. | 371/67.1 |

FOREIGN PATENT DOCUMENTS 9101181  7/1991  Netherlands .
WO93/25024  12/1993  WIPO .

OTHER PUBLICATIONS

Willian Hsu, "Generic Virus Detection" MacTutor, vol. 8(2), issue 56, pp. 56–71, Jun. 1992.

*Primary Examiner*—Hoa T. Nguyen
*Attorney, Agent, or Firm*—Ronald L. Yin; Limbach & Limbach

[57] ABSTRACT

A probabilistic method of detecting viral intrusion into an original computer file is disclosed. In the method, a protection file is first created. In the preferred embodiment, the protection files is created by generating a test string. The test string is compared to the original computer file and is discarded in the event of a match. The test string is kept in the event of a non-match. The protection file is created by storing a plurality of non-matching test strings. In the detection stage, the file to be screened for possible viral infection is compared to each of the test strings of the protection file. The computer file being screened is determined to be probabilistically free of a viral infection if all of the test strings in the protection file do not match the file being screened. However, in the event of a match between a test string and the file being screened, then a change in the file being screened is detected.

39 Claims, 3 Drawing Sheets

METHOD OF DETECTING CHANGES TO A COLLECTION OF DIGITAL SIGNALS

TECHNICAL FIELD

The present invention relates to a method to detect changes to a collection of digital signals, such as that stored or used in a computer. More particularly, the present invention relates to a method of detecting changes in a computer file caused by, for example, virus or other forms of unauthorized alteration.

BACKGROUND OF THE INVENTION

As computer systems and software become more interconnected, e.g. hardware connection through networks and software connection through portability of computer programs and data, it becomes increasingly difficult to ensure the security of the computer system from unauthorized intrusions, by unauthorized users and unauthorized alterations, such as by viruses. Furthermore, as computers become more interconnected, it becomes more difficult to isolate the intrusion once an intrusion has occurred at one node of a computer network.

Virus detection programs are well known in the art. In a typical prior art virus detection program, the program seeks to determine the existence of a particular virus residing within the storage subcomponent (memory or disk) of a computer. However, such prior art anti-viral programs detect only a priori known viruses. If a new virus were developed and introduced into the computer program, with the anti-viral program not being able to identify the new virus, the anti-viral program would be unable to detect the existence of the newly introduced virus. Therefore, one of the short comings of the anti-viral programs of the prior art is that the anti-viral programs must be constantly updated to identify newly created viruses.

Similarly, another problem with the prior art anti-viral programs is that once a virus has "infected" one node of a computer on a network, and if the anti-viral program is unable to detect it, and if the same anti-viral program is residing on all of the other computers on the network, then the virus can spread undetected to all the other computers on the network. The result is that any new virus which can intrude into a node on a computer network, is virtually assured that it can spread and intrude into the entire computer network.

In the computer arts, programs that compare one file to another file to detect changes therein, similar to anti-viral programs, are also well known. In addition, file authentication methods, such as checksum, or the like are also well known in the art.

In the field of biology, immune system cells are well known in the art. T cells are part of the immune system. T cells have receptors on their surfaces that can detect antigens. These receptors are made by a pseudo-random genetic process and it is highly likely that some receptors will detect molecules from the body or "self molecules". T cells undergo a censoring process in the thymus called negative selection. In negative selection, T cells that recognize self molecules or molecules that are normal to the body, and in particular the molecules being peptides, are destroyed and are not allowed to leave the thymus. The T cells that do not detect self peptides leave the thymus and provide one basis for the immune protection against foreign antigens.

SUMMARY OF THE INVENTION

In the present invention, a method of generating a computer protection file to protect an original computer file having a plurality of contiguous digital signals is disclosed. The method first generates a test file. The test file has a plurality of contiguous digital signals. The method attempts to match the plurality of contiguous digital signals of the test file to the plurality of contiguous digital signals of the original computer file. In the event there is a match, the test file is discarded and the method is reverted back to generate another test file, different from the preceding test file. In the event of a non-match, the test file is stored.

The present invention also comprises a method of detecting changes to an original computer file, where the original computer file has an associated protection file. The original computer file has a plurality of contiguous digital signals. The associated computer protection file also has a plurality of test files, each of which has a plurality of contiguous digital signals, not matching to the plurality of contiguous digital signals of the original computer file, at the time the original computer protection file was created. The method compares the plurality of contiguous digital signals of one test file of the computer protection file to the plurality of contiguous digital signals of the original computer file. A different test file is chosen and the method is reverted back to the comparison step in the event of a non-match until all of the test files in the computer protection file have been tested. The method is terminated and a change is detected in the original computer file, in the event of a match between a test file and the original computer file.

DETAILED DESCRIPTION OF DRAWINGS

The present invention relates to a method of generating a computer protection file to protect an original computer file. As used herein, including in the claims, the term "file" means a collection of digital information. Such a collection of digital information can refer to a physical file stored physically on some storage medium, such as a disk drive of a computer, or a logical file being a portion of another physical file. The term "file" may even be encoded and contained within other "files", such as the computer protection file being contained within the original computer file. In short, the term "file" is not limited to a physical collection separated from another physical collection but simply refers to a collection of digital information.

Figure 1A:
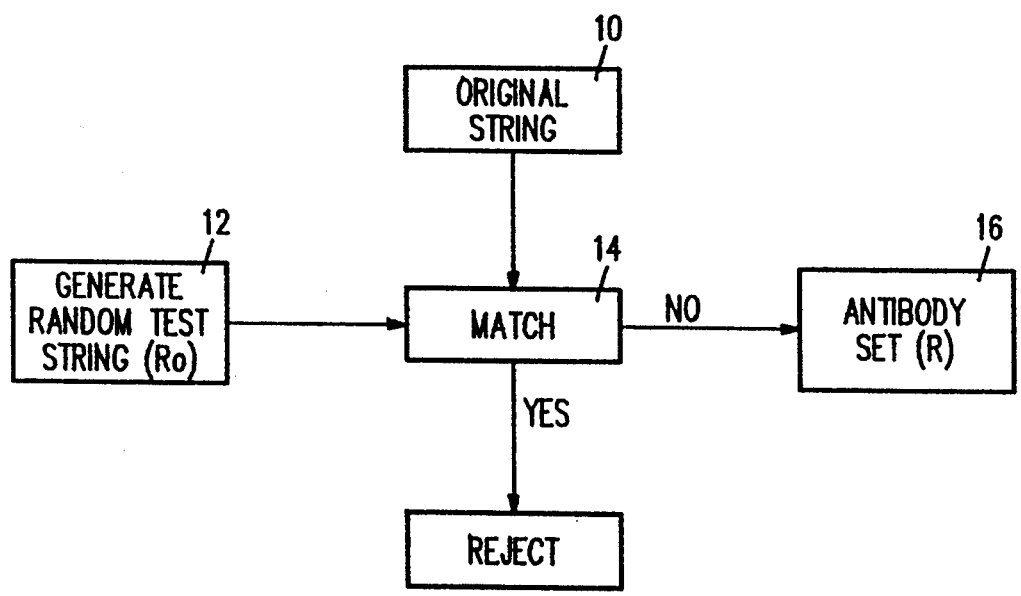
FIGS. 1a and 1b are flow charts of two method of the preferred embodiment of the present invention to generate a computer protection file and to detect changes to an original computer file after the computer protection file has been generated, respectively.

Referring to FIG. 1a, there is shown a flow chart of the method of the present invention to generate the computer protection file 16 to protect an original computer file 10. The original computer file 10 is designated as a file having a plurality of contiguous digital signals or a string. Since the method of present invention relates generally to a collection of digital information to be protected in a computer system, the original string 10 can be binary signals or a collection of larger based signals such as by byte or by character. The computer would generate randomly a test file designated as a test string ($R_0$) 12. The test string 12 also has a plurality of contiguous digital signals. An attempt is then made to match the test string 12 which is randomly generated against a portion of the original string 10. As will be described in greater detail, the plurality of contiguous digital signals of the test string R0 is attempted to be matched to the plurality of contiguous digital signals of the original string 10. In the event of a match (the criteria for which will be discussed in greater detail hereinafter), the test string 12 is then rejected and the method continues by generating another random test string 12 and continuing with the aforementioned steps. In the event of a non-match, test string 12 is kept in the computer protection file 16 or the antibody set (R) 16. In the preferred embodiment, the method described heretofore is continued until a plurality of non-matching test files 12 are stored in the antibody set (R) 16, as the computer protection file.

To attempt to match the plurality of contiguous digital signals of the randomly generated test string 12 to the plurality of contiguous digital signals of the original string 10, the original string 10 is first parsed or split logically into a plurality of contiguous segments, with each segment comprising a plurality of contiguous digital signals. In the preferred embodiment, the original string 10 is parsed or split into equal size segments. However, this is not a necessary limitation but is only one based upon convenience. For example, if the original string 10 is a 32 bit string comprising of:

00101000100100000100001010010011

The above described 32 bit string can be parsed into 8 segments each comprising four contiguous digital bits, in the following manner:

0010|1000|1001|0000|0100|0010|1001|0011

With the original string parsed into 8 segments each having four contiguous digital bits, each of the test string 12 randomly generated would also be four contiguous digital bits in length. The test string 12 is then compared to each of the segments by testing each of the digital signals of the test string 12 against the digital signal of each of the segments. Thus, if the test string 12 contains the contiguous digital signals of "1000" then a match is found between the test string 12, and the second segment. In that event, the method continues by randomly generating a different test string 12, and attempting to match that test string 12 against each of the segments of the original string 10.

In the event the randomly generated test string 12 is found not to match any of the segments of the original string 10, such as, for example, the test string being "0111" then that test string 12 will be stored in the antibody set (R) 16. In the preferred embodiment, another test string 12 will be randomly generated and will be tested against each of the segments of the original string 10, until a plurality of test strings 12, each of which do not match any of the segments of the original string 10 are stored in the antibody set (R) 16.

Figure 1B:
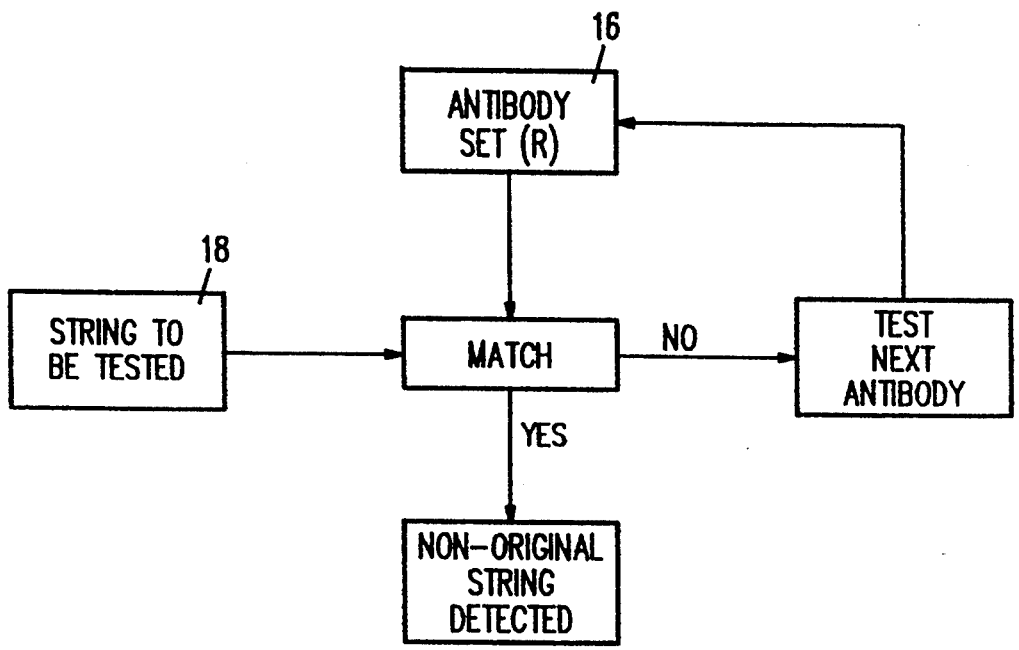

Referring to FIG. 1b, there is shown a flow chart diagram of another method of the present invention, wherein once the plurality of test strings 12 that do not match, as determined in the aforementioned method had been found and are stored in the antibody set (R) 16, then the antibody set (R) 16 is used to determine if changes have occurred in a string 18 to be tested. The string 18 to be tested bears a relationship to the original string 10 tested. In the case where no unauthorized intrusion or invasion of the original string or original computer file 10 has occurred, then the string 18 to be tested is identical to the original string 10. However, in the event the original string 10 has been altered or invaded by a virus or the like, since the antibody set (R) 16 was generated, then the string 18 to be tested is a variation of the original string 10. The method of the invention as depicted in FIG. 1b determines if the string 18 to be tested has a high probability of being the original string 10 or is an altered variation thereof.

In the preferred embodiment, the string 18 to be tested is also parsed or split into a plurality of segments with each of the segments comprising a plurality of contiguous digital signals. Again, in the preferred embodiment the segments are equal in length and are equal to the length of the segment used in the creation of the antibody set (R) 16. Continuing with the example given above, the string 8 can be parsed into 8 segments with each segment having 4 bits in length. Each of the test string from the antibody set (R) 16 being 4 bits in length would be matched against each one of the segments of the string 18. In the event a test string 12 from the antibody set (R) 16 does not match any of the segments from string 18, then the next test string 12 from the antibody set (R) 16 is used. This continues until all of the test strings 12 from the antibody set (R) 16 are tested at which point the string 18 is declared as having a high probability of being the same as the original string 10.

On the other hand, if any one of the test strings 12 from the antibody set (R) 16 matches any one of the segments of the string 18, then the string 18 is declared to be not identical to the original string 10 and an alteration to the original string 10 has occurred.

Figure 3:
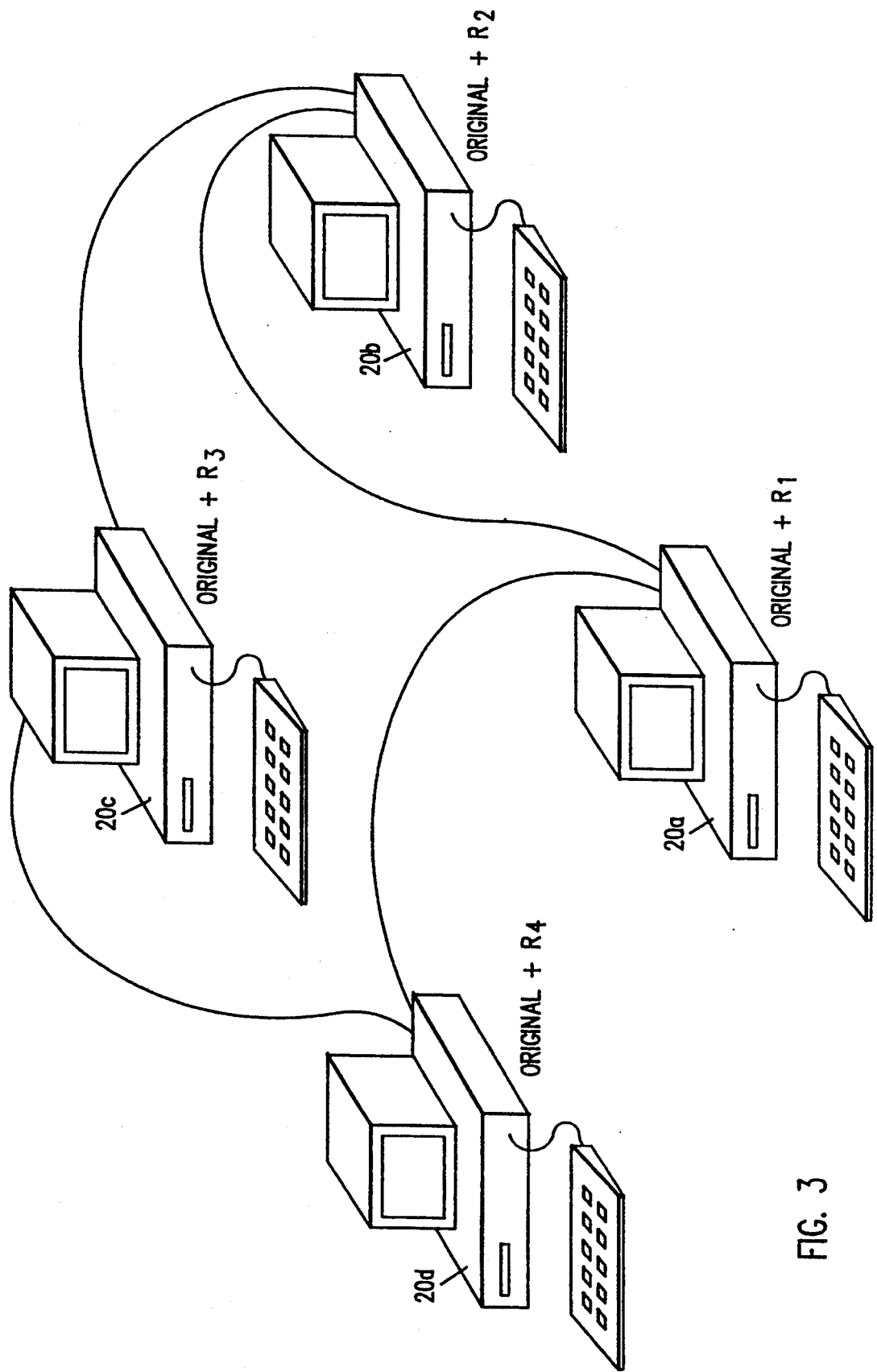
FIG. 3 is a schematic diagram of a network of computer, with each of the computers having an original computer file, and an associated different computer protection file, to thwart the spread of a virus, in the event of intrusion into one node of the network.

Referring to FIG. 3, there is shown a schematic diagram of a plurality of computers 20 (A–D) connected in a network. The advantage of the foregoing methods of the present invention can be seen with reference to the diagram shown in FIG. 3. If we assume that each of the computers 20 executes the identical original computer program or string 10, then by the method described and shown in FIG. 1a, each of the computers 20 (A–D) would generate a an associated computer protection file or antibody set (R) 16 different from the one generated by the other computers 20. Since each of the protection file 16 is created based upon randomly generated test strings 12, the protection file 16 associated with computer 20A, labeled as $R_1$, would be different from the protection file 16, labeled $R_2$ associated with the original string 10 generated by the computer 20B. Thus, for each of the computers 20, the protection file 16 associated with the original file 10, is different.

Let us assume now that the virus or unauthorized intrusion had occurred in one of the computer nodes, e.g. computer 20A. Let us assume further that the computer protection file $R_1$ associated with original computer file 10 operating at computer 20A was unable to detect the virus intrusion. The virus would then propagate along the interconnection to computer 20B. Since it is the same virus, it would affect the original computer file or original string 10 executing on the computer 20B in the same manner as it affected the original string 10 executing on the computer 20A. However, since the computer protection file or the antibody set 16 $R_2$ associated with the original file 10 of computer 20B is different from the computer protection file 16 of computer 20A, the testing method, described heretofore, may detect the presence of the virus in its alteration of the original computer file 10, whereas the computer protection file $R_1$ of the computer 20A was unable to detect that viral intrusion. Therefore, in order for the virus to invade the entire computer network, the virus must overcome not only the computer protection file $R_1$ of computer 20A but also the protection file $R_2$ of computer 20B, the protection file $R_3$ of computer 20C, and the protection file $R_4$ of computer 20D. As can be seen, as the number of computers in the network increases, the ability of the virus to escape detection correspondingly decreases with more different protection files on the network. Thus, with method of the present invention, the detection of a viral intrusion into an original string 10 is a probabilistic based determination.

PROBABILITY OF DETECTION

Since detection is probabilistic, the following describes the probability for different configuration of the test string of the protection file 16 and original string 10. At the outset, it should be noted that a perfect match between two strings of equal length means that at each location in the string, the digital signals (a binary signal, or a collection of binary signals such as a byte or a character signal) are identical. In one embodiment, a match is deemed to occur if r contiguous matches between symbols in corresponding locations has occurred. Furthermore, if the length of the string is l and m is the number of alphabet symbols (m=2 where the symbol is a binary 1 and is on the order of 104, for an instruction set from a SPARC processor, and m=50 for an intermediate value), then the probability of a match is determined as follows:

If we define the following terms:

$N_{R0}$ = The initial number of test strings (before attempting to match)

$N_R$ = The number of test strings after attempting to match $N_S$ = The number of segments of the original string $P_M$ = The probability of a match between 2 random strings f = The probability of a random string not matching any of the $N_S$ original strings
$= (1-P_M)^{N_S}$ $P_f$ = The probability that $N_R$ antibodies fail to detect an intrusion.

If $P_M$ is small and $N_S$ is large, then
$f \approx e^{-P_M N_S}$ and, $$N_R = N_{R_o} \times f$$

$$P_f = (1 - P_M)^{N_R}$$
$$\approx e^{-P_M N_R}$$

Solving the above for $N_R$, $$\ln P_f = N_R \ln (1 - P_M)$$
or $$N_R = \frac{\ln P_f}{\ln (1 - P_M)}$$

since f is approximately $e^{-P_M N_S} = (1-P_M)^{N_S}$ $-P_M N_S = N_S \ln (1 - P_M)$
or
$-P_M = \ln (1 - P_M)$
or $$N_R = \frac{\ln P_f}{-P_M} = \frac{-\ln P_f}{P_M}$$

we get the following:

$$N_R = N_{R_o} \times f$$
or $$N_{R_o} = \frac{-\ln P_f}{P_M \times f}$$
$$= \frac{-\ln P_f}{P_M \times (1 - P_M)^{N_S}}$$

This formula allows us to predict the number of initial strings ($N_{R0}$) that will be required to detect an intrusion as a function of the probability of detection $(1-P_f)$, the number of segments of original strings being protected ($N_S$), and the matching rule ($P_M$). $R_0$ is minimized by choosing a matching rule such that $$P_M = \frac{1}{N_s}$$

This shows that we can choose a desired probability of detection, and then estimate the number of antibody strings required as a function of the size of $N_s$ (the number of strings to be protected).

Since an increased probability of detection results in increased computational expense (due to the increased size of $R_0$ and R), one can choose a desired probability of detection by determining (a) how fatal a single intrusion would be, and (b) how much redundancy exists in the system (i.e., how many independent copies of the detection algorithm will exist). Note, that the probability of detection increases exponentially with the number of independent detection algorithms. If $N_t$ = the numbers of copies of the algorithm, then $$P_{\text{system fails to detect}} = (P_f)^{N_t}$$

The following table of values can be derived for different alphabet sizes, i.e. m, for corresponding r and l values.

| r/l | $P_M$ 16 | 32 | 50 |
|---|---|---|---|
| ALPHABET SIZE = 2 | | | |
| 1 | 1.0 | 1.0 | 1.0 |
| 2 | 1.0 | 1.0 | 1.0 |
| 3 | 0.938 | 1.0 | 1.0 |
| 4 | 0.438 | 0.938 | 1.0 |
| 5 | 0.203 | 0.453 | 0.734 |
| 6 | 0.094 | 0.218 | 0.359 |
| 7 | 0.043 | 0.105 | 0.176 |
| 8 | 0.020 | 0.051 | 0.086 |
| ALPHABET SIZE = 50 | | | |
| 1 | 0.314 | 0.628 | 0.984 |
| 2 | 0.006 | 0.012 | 0.019 |
| 3 | 1.10E-04 | 2.35E-04 | 3.76E-04 |
| 4 | 2.04E-06 | 4.55E-06 | 3.98E-06 |

-continued

| r/l | 16 | $P_M$ 32 | 50 |
|---|---|---|---|
| 5 | 3.77E-08 | 8.79E-08 | 3.75E-07 |
| 6 | 6.91E-10 | 1.69E-09 | 3.52E-19 |
| 7 | 1.26E-11 | 3.26E-11 | 3.31E-11 |
| 8 | 2.26E-13 | 6.28E-13 | 3.11E-12 |
| ALPHABET SIZE = 104 | | | |
| 1 | 0.152 | 0.305 | 0.476 |
| 2 | 0.001 | 0.003 | 0.004 |
| 3 | 0.123E-05 | 2.64E-05 | 4.23E-05 |
| 4 | 1.1E-07 | 2.46E-07 | 3.98E-07 |
| 5 | 9.78E-10 | 2.28E-09 | 3.75E-09 |
| 6 | 8.62E-12 | 2.11E-11 | 3.52E-11 |
| 7 | 7.53E-14 | 1.96E-13 | 3.31E-13 |
| 8 | 6.52E-16 | 1.81E-15 | 3.11E-15 |

The foregoing tables were dervied based upon approximations to the formula. In the event, exact formulas are used, the following tables of value are derived.

| r/l | 16 | $P_M$ 32 | 50 |
|---|---|---|---|
| ALPHABET SIZE = 2 | | | |
| 1 | 1.000 | 1.000 | 1.000 |
| 2 | 0.961 | 0.999 | 1.000 |
| 3 | 0.702 | 0.922 | 0.983 |
| 4 | 0.395 | 0.665 | 0.827 |
| 5 | 0.197 | 0.390 | 0.552 |
| 6 | 0.093 | 0.205 | 0.315 |
| 7 | 0.043 | 0.103 | 0.165 |
| 8 | 0.020 | 0.050 | 0.084 |
| ALPHABET SIZE = 50 | | | |
| 1 | 0.276 | 0.476 | 0.636 |
| 2 | 0.006 | 0.012 | 0.019 |
| 3 | 1.021E-04 | 2.353E-04 | 3.764E-04 |
| 4 | 1.885E-06 | 4.550E-06 | 7.373E-06 |
| 5 | 3.456E-08 | 8.787E-08 | 1.443E-07 |
| 6 | 6.285E-10 | 1.695E-09 | 2.824E-09 |
| 7 | 1.132E-11 | 3.264E-11 | 5.522E-11 |
| 8 | 2.012E-13 | 6.277E-13 | 1.079E-12 |
| ALPHABET SIZE = 104 | | | |
| 1 | 0.143 | 0.266 | 0.383 |
| 2 | 0.001 | 0.003 | 0.004 |
| 3 | 1.233E-05 | 2.642E-05 | 4.227E-05 |
| 4 | 1.101E-07 | 2.456E-07 | 3.980E-07 |
| 5 | 9.776E-10 | 2.280E-09 | 3.745E-09 |
| 6 | 8.617E-12 | 2.114E-11 | 3.523E-11 |
| 7 | 7.533E-14 | 1.958E-13 | 3.312E-13 |
| 8 | 6.520E-16 | 1.810E-15 | 3.112E-15 |

ALTERNATIVE EMBODIMENT

Figure 2A:
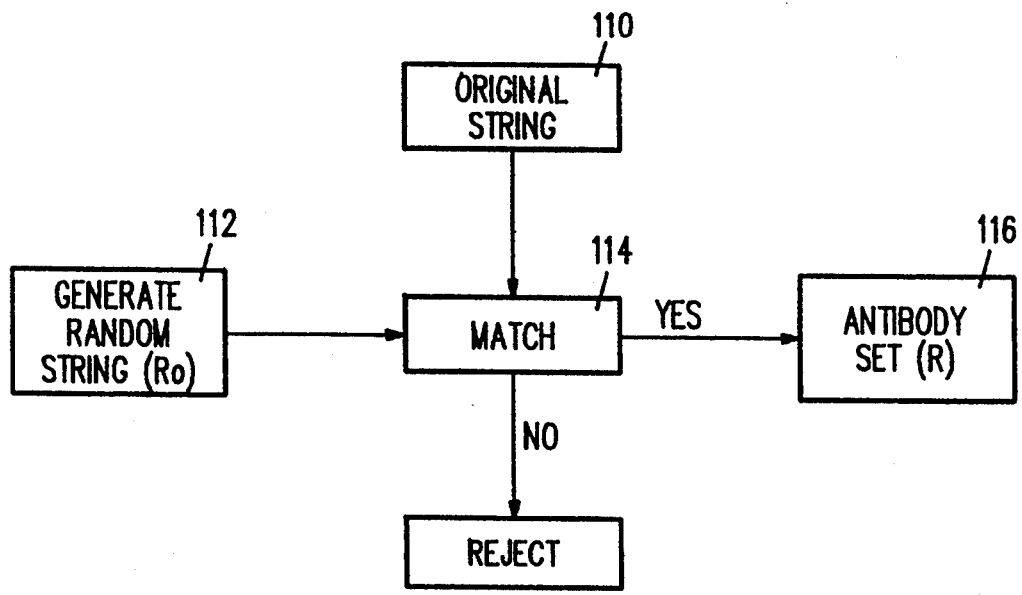
FIGS. 2a and 2b are flow charts of another embodiment of the methods shown in FIGS. 1a and 1b respectively.

Referring to FIG. 2a, there is shown a flow chart of an alternative embodiment to the method of the present invention as depicted in FIG. 1a. In the flow chart shown in FIG. 2a, the original string is depicted as 110. The computer upon which the method of the present invention is operating generates a random test string 112. The original string 110 similar to the original string 10 shown in FIG. 1a, is parsed into a plurality of segments. In the preferred embodiment all of the segments are equal with each of the segments comprising a plurality of contiguous digital signals. The computer then attempts to match the randomly generated test string 112 to each of the segments of the original string 110. In the event there is no match, the test string 112 is discarded.

In the event the test string 112 matches a segment of the original string 110, then the test string 112 is kept in the protection file 116 as part of the antibody set (R) 116. The generation of the antibody set (R) 116 is the exact complementary logic of the antibody set (R) 16 shown and described in FIG. 1a. However, because the test string 112 may match more than one segment of the original string 110, the specific location or locations where the test string 112 matches the original string 110 must also be stored in the antibody set (R) 116. Alternatively, data concerning the number of times in which the test string 112 matches the segments of the original string 110 must be recorded, in the antibody set (R) 116.

Figure 2B:
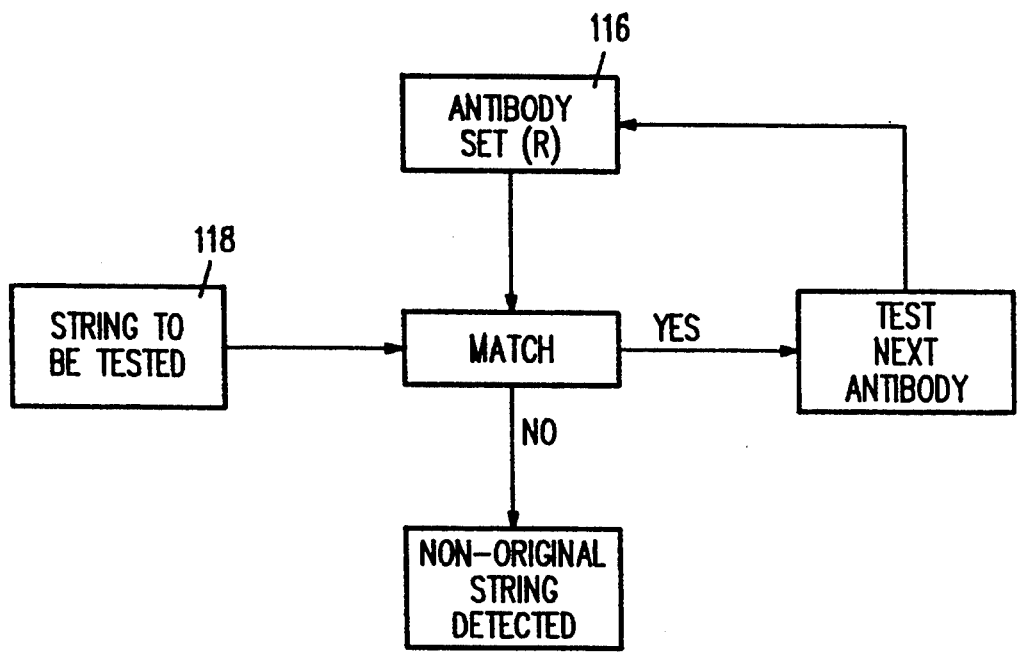

Similar to the flow chart shown in FIG. 2a, the flow chart in FIG. 2b depicts a method of the present invention which is an alternative embodiment to the method depicted in the flow chart in FIG. 1b. Once the antibody set (R) file 116 is created, it is tested against a string 118. An attempt is made to match a test string 112 from the antibody set 116 against the string 118 to be tested, at each of the locations at which the test string 112 from the antibody set 116 is suppose to match against the string 118. If a non-match occurs, then the string 118 is not identical to the original string 110 and a change to the original string 110 has been detected.

If the test string 112 from the antibody set 116 matches a segment of the string 118, then the computer compares the test string 112 against all the rest of the segments, until all the locations where the match is suppose to occur has been tested, or the required number of matches has occurred. This is necessary because if there are a plurality of matches and if a virus affects only one segment of the original string 110, the matching test must compare the test string 112 from the antibody set 116 against all of the supposedly matching segments of the original string 110, to ensure that no alteration has occurred. If the test string 112 from the antibody set 116 matches the requisite number of times the segments of the string 118, or at the requisite locations, then a second test string 112 is retrieved from the antibody set 116 and another matching test is performed against the string 118, until all of the test strings 112 have been tested. In the event all of the test strings 112 matches the segments of the string 118, in the requisite locations or number of times, then the string 118 is declared as having a high probability of being the same as the original string 110.

The advantage of the methods of the invention described and shown in FIGS. 2a and 2b in probabilistically detecting a change in an original file is equally applicable to a network as shown and described in FIG. 3. Since each of the computers 20(A–D) in a network would generate its own antibody set 116 which is different from the antibody set 116 of the other computers 20, the probability of a virus escaping detection by permeating the entire computer network decreases as the number of computers in the network increases.

OTHER CONSIDERATIONS

As previously discussed, the present invention is not limited to the creation or the testing of a physical "file". The use of the term "file" is simply a shorthand to define a collection of digital information which can comprise a collection of digital signals, either binary or in a higher grouping such as by byte or by character signals.

In addition, as previously discussed, the concept of "match" is not limited to an identical match, at every location. One example described hereinabove is simply "r contiguous matches between symbols in corresponding positions, in a string length l, where r<l". Another embodiment is simply "r matches between symbols in corresponding positions, in a string length l, where r<1". This embodiment relaxes the requirement that the matches between symbols in corresponding positions must be contiguous matches. Other forms of match can include logically equivalent such as complementary form. Thus, for example, the binary string "0111" may be deemed a match to "1000" since the two are logically complementarily equivalent.

Further, in generating the computer protection file 16 as shown and described in FIG. 1a, by keeping a "non-matching" test string 12 to the original string 10, the test string 12 need not be rejected if there is a match of, e.g. one symbol, in corresponding locations. In other words, the computer protection file 16 need not comprise a plurality of "pure" test strings 12, none of which has any single symbol matching any of the corresponding symbols in the original string 10. A low level of matching may be tolerated.

Consequently, upon testing each test string 12 of the computer protection file 16 to the string 18 to be tested, as shown and described in FIG. 1b, a low level match, such as the match of a single symbol in corresponding locations, need not result in a declaration that the original string 10 has been altered.

Similarly, in generating the computer protection file 116, as shown and described in FIG. 2a, by keeping a "matching" test string 112 to the original string 110, the test string 112 need not be rejected if there is a non-match of, e.g. one symbol, in corresponding locations. In other words, the computer protection file 116 need not comprise a plurality of "pure" test strings 112, none of which has any single symbol not matching any of the corresponding symbols in the original string 110. A low level of non-matching may be tolerated.

Likewise, upon testing each test string 12 of the computer protection file 16 to the string 18 to be tested, as shown and described in FIG. 2b, a low level non-match, such as the non-match of a single symbol in corresponding locations, need not result in a declaration that the original string 10 has been altered.

Therefore, as used herein, including the claims, the term "match" includes any and all of the foregoing described methods, including but not limited to a low level of "match" or "non-match" as the case may be.

The rationale for the tolerance of low level of match or non-match is that a virus that causes only a few changes, such as a change in a single symbol (bit or byte), would not be spreading. If and when the virus replicates, then many changes would occur, and the virus would then be detected. The trade-off for tolerating a low level virus attack is that the algorithm to protect the original string would execute faster, but with an accompanying decrease in protection. This is analogous to the human immune system where a low level virus attack does not necessarily cause an immune response.

Lastly, the generation of the test string 12 or 112, in the method shown and described in FIGS. 1a and 2a do not have to be randomly generated. So long as the test string 12 or 112, which is subsequently generated is different from the test string 12 or 112 generated preceding thereto, the method of the present invention would function just as well.

What is claimed is:

1. A method of generating a protection string having a plurality of nonmatching test strings for use in a method of protecting an original string having a plurality of contiguous first digital signals, said method comprising the steps of:

a) generating a test string having a plurality of contiguous test digital signals;

b) attempting to match said test string qenerated in step (a) to said original string; and c)(1) discarding said test string generated in step (a) in the event of a match, and reverting to step (a) and generating a different test string; or c)(2) retaining said test string as one of the plurality of non-matching test strings of the protection string in the event of a non-match.

2. The method of claim 1 wherein step (c) (2) further comprising:

reverting to the method of step (a) to (c) (2); and terminating the method after a plurality of non-matching test strings are retained.

3. The method of claim 1 further comprising the step of:

parsing said original string into a plurality of contiguous segments.

4. The method of claim 3 wherein said attempting step comprises attempting to match each of the non-matching test string to each of said segments of said original string.

5. The method of claim 1 wherein said test string is randomly generated.

6. A method of detecting changes to an original string having a plurality of first contiguous digital signals by a protection string having a plurality of test strings with each test string having a plurality of second contiguous digital signals said protection string created for use in a method to detect changes to said original string, each test string not matching the original string at the time said protection string was created, said method comprising the steps of:

(a) comparing the second contiguous digital signals of one test string of said protection string to the plurality of first contiguous digital signals of the original string; and (b)(1) reverting to the method of step (a) and comparing with a different test string, until all of the test strings in said protection string have been compared, in the event of a non-match; and (b)(2) terminating said method and determining the existence of a change in the original string, in the event of a match between a test string and the original string.

7. The method of claim 6 wherein said original string is parsed into a plurality of contiguous segments with each of said contiguous segments comprising a first contiguous digital signals.

8. The method of claim 7 wherein said comparing step compares the plurality of second contiguous digital signals of one test string of said protection string to each of the plurality of first contiguous digital signals of each of the contiguous segments of the original string.

9. A method of protecting an original string having a first plurality of contiguous digital signals comprising the steps of:

a) generating a test string having a second plurality of contiguous digital signals;

b) comparing said second plurality of contiguous digital signals of said test string to said first plurality of contiguous digital signals of said original string;

c)(1) reverting to the method of step (a) and generating a different test string, in the event said comparing step results in a match between said second plurality of contiguous digital signals of said test string to said first plurality of contiguous digital signals of said original string; and c)(2) retaining said test string in the event of a non-match and reverting to the method of step (a) until a protection string comprising a plurality of non-matching test strings are retained;

(d) comparing the second plurality of contiguous digital signals of one test string of said protection string to the first plurality of contiguous digital signals of the original string; and (e)(1) reverting to the method of step (d) and comparing with a test string different from said one test string of said protection string, until all of the test strings in said protection string have been compared, in the event of a non-match; and (e)(2) terminating said method and determining the existence of a change in the original string, in the event of a match between a test string and the original string.

10. The method of claim 9 further comprising the step of:

parsing said original string into a plurality of contiguous segments, with each segment being one of said first plurality of contiguous digital signals.

11. The method of claim 10 wherein said comparing step (b) comprises attempting to match the second plurality of contiguous digital signals of said test string to said plurality of contiguous digital signals of each of said segments of said original string.

12. The method of claim 10 wherein said comparing step (d) comprises attempting to match the second plurality of contiguous digital signals of said test string to said plurality of contiguous digital signals of each of said segments of said original string.

13. The method of claim 9 wherein said test string is randomly generated.

14. A method of protecting a plurality of identical original computer files, stored in a plurality of computers, each of said original computer files having a plurality of contiguous digital signals, said method at each computer comprising the steps of:

a) randomly generating a test string having a plurality of contiguous digital signals;

b) comparing said plurality of contiguous digital signals of said test string to said plurality of contiguous digital signals of said original computer file;

c)(1) reverting to the method of step (a), in the event said comparing step results in a match between said plurality of contiguous digital signals of said test string and said plurality of contiguous digital signals of said original computer file; and c)(2) storing said test string in a computer protection file in the event of a non-match and reverting to the method of step (a) until a plurality of non-matching test strings are stored in said computer protection file;

(d) comparing the plurality of contiguous digital signals of one of said plurality of nonmatching test strings of said computer protection file to the plurality of contiguous digital signals of the original computer file; and (e)(1) reverting to the method of step (d) and comparing with a test string different from said one of said plurality of non-matching test string, until all of the plurality of non-matching test strings in said computer protection file have been compared, in the event of a non-match; and (e)(2) terminating said method and determining the existence of a change in the original computer file, in the event of a match between a test string and the original computer file.

15. The method of claim 14 further comprising the step of:

parsing said original computer file into a plurality of contiguous segments.

16. The method of claim 15 wherein said comparing step (b) comprises attempting to match the plurality of contiguous digital signals of said test string to each of said segments of said original computer file.

17. The method of claim 15 wherein said comparing step (d) compares the plurality of contiguous digital signals of one test string of said computer protection file to each of the segments of the original computer file.

18. The method of claim 14 wherein said plurality of computers are interconnected in a network.

19. A method of generating a protection string having a first plurality of contiguous digital signals for use in a method to protect an original string having a second plurality of contiguous digital signals, said method comprising the steps of:

a) generating a test string having a plurality of contiguous digital signals fewer in number than said second plurality of contiguous signals of said original string;

b) attempting to match said plurality of contiguous digital signals of said test string to portions of said second plurality of contiguous digital signals of said original string; and c)(1) discarding said test string in the event of a non-match, and reverting to the method of step (a) to generate a different test string; or c)(2) storing said test string in said protection string in the event of a match.

20. The method of claim 19 wherein step (c)(2) further comprising:

reverting to the method of step (a); and terminating the method after a plurality of matching test strings are stored in said protection string.

21. The method of claim 19 further comprising the step of:

parsing said original string into a plurality of contiguous segments, with each segment comprising a plurality of contiguous digital signals.

22. The method of claim 21 wherein said attempting step comprises attempting to match the plurality of contiguous digital signals of said test string to said plurality of contiguous digital signals of each of said segments of said original string.

23. The method of claim 19 further comprising the step of (c)(3) storing the location of the position in said second plurality of contiguous digital signals of said original string where said test string matches said original string.

24. The method of claim 19 wherein test string is randomly generated.

25. A method of detecting changes to an original string having a plurality of contiguous first digital signals by a protection string having a plurality of test strings, with each of said test strings having a plurality of contiguous second digital signals, matching to a portion of said plurality of contiguous first digital signals of said original string at the time said protection string was created, said method comprising the steps of:

(a) comparing the plurality of contiguous second digital signals of one test string of said protection string to the plurality of first contiguous digital signals of the original string; and (b)(1) reverting to the method of step (a) and comparing with a different test string, until all of the test strings in said protection string have been compared, in the event of a match; and (b)(2) terminating said method and determining the existence of a change in the original string, in the event of a non-match between a test string and the original string.

26. The method of claim 25 wherein said protection string is parsed into a plurality of contiguous segments with each of said segments comprising a plurality of contiguous third digital signals.

27. The method of claim 26 wherein said comparing step compares the plurality of second contiguous digital signals of one test string of said protection string to the plurality of contiguous third digital signals of each of the segments of the original string.

28. A method of protecting an original computer file, having a plurality of first contiguous digital signals, comprising the steps of:

a) generating a test string, said test string having a plurality of second contiguous digital signals, fewer in number than said plurality of first contiguous signals of said original computer file;

b) comparing said plurality of second contiguous digital signals of said test string to said plurality of first contiguous digital signals of said original computer file;

c)(1) reverting to the method of step (a) and generating a different test string, in the event said comparing step results in a non-match between said plurality of second contiguous digital signals of said test string and said plurality of first contiguous digital signals of said original computer file; and c)(2) storing said test string in a protection file in the event of a match; and c)(3) reverting to the method of step (a) to c(2) until a plurality of matching test strings are stored in said protection file;

(d) comparing the plurality of second contiguous digital signals of one of said plurality of matching test strings of said protection file to the plurality of first contiguous digital signals of the original computer file; and (e)(1) reverting to the method of step (d) and comparing with a different test string, until all of the test strings in said protection file have been compared, in the event of a match; and (e)(2) terminating said method and determining the existence of a change in the original computer file, in the event of a nonmatch between a test string and the original computer file.

29. The method of claim 28 further comprising the step of:

parsing said original computer file into a plurality of contiguous segments, with each segment comprising a plurality of third contiguous digital signals.

30. The method of claim 29 wherein said comparing step (b) comprises attempting to match the plurality of second contiguous digital signals of said test string to said plurality of third contiguous digital signals of each of said segments of said original computer file.

31. The method of claim 29 wherein said comparing step (d) comprises attempting to match the plurality of second contiguous digital signals of said test string to said plurality of third contiguous digital signals of each of said segments of said original computer file.

32. The method of claim 28 wherein said storing step of (c)(2) further stores the location of the position in said plurality of first contiguous digital signals of said original computer file where said test string matches said original computer file.

33. The method of claim 28 wherein said test string is randomly generated.

34. A method of protecting a plurality of identical original computer files, stored in a plurality of computers, each of said original computer files having a plurality of first contiguous digital signals, said method at each computer comprising the steps of:

a) randomly generating a test string, said test string having a plurality of second contiguous digital signals, fewer in number than said plurality of first contiguous signals of said original computer file;

b) comparing said plurality of second contiguous digital signals of said test string to said plurality of first contiguous digital signals of said original computer file;

c)(1) reverting to the method of step (a), in the event said comparing step results in a non-match between said plurality of second contiguous digital signals of said test string and said plurality of first contiguous digital signals of said original computer file; and c)(2) storing said test string in a computer protection file in the event of a match; and c)(3) reverting to the method of step (a) to (c)(2) until a plurality of matching test strings are stored in said computer protection file;

(d) comparing the plurality of second contiguous digital signals of one of said plurality of matching test strings of said computer protection file to the plurality of first contiguous digital signals of the original computer file; and (e)(1) reverting to the method of step (d) and comparing with a different test string, until all of the test strings in said computer protection file have been compared, in the event of a match; and (e)(2) terminating said method and determining the existence of a change in the original computer file, in the event of a nonmatch between a test string and the original computer file.

35. The method of claim 34 further comprising the step of:

parsing said original computer file into a plurality of contiguous segments, with each segment comprising a plurality of third contiguous digital signals.

36. The method of claim 35 wherein said comparing step (b) comprises attempting to match the plurality of second contiguous digital signals of said test string to said plurality of third contiguous digital signals of each of said segments of said original computer file.

37. The method of claim 35 wherein said comparing step (d) compares the plurality of second contiguous digital signals of one of said plurality of matching test strings of said computer protection file to the plurality of third contiguous digital signals of each of the segments of the original computer file.

38. The method of claim 34 wherein said plurality of computers are interconnected in a network.

39. The method of claim 34 wherein said storing step of (c)(2) further stores the location of the position in said plurality of first contiguous digital signals of said original computer file where said test string matches said original computer file.

* * * * *